(12) United States Patent
Chiang

(10) Patent No.: US 7,830,363 B2
(45) Date of Patent: Nov. 9, 2010

(54) SHAPE-CHANGEABLE MOUSE

(75) Inventor: Hsiao-Lung Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 702 days.

(21) Appl. No.: 11/687,042

(22) Filed: Mar. 16, 2007

(65) Prior Publication Data

US 2008/0170038 A1    Jul. 17, 2008

(30) Foreign Application Priority Data

Jan. 11, 2007   (TW) .............................. 96101028 A

(51) Int. Cl.
*G06F 3/033*   (2006.01)
*G06F 3/02*    (2006.01)
*G09G 5/08*    (2006.01)

(52) U.S. Cl. ..................... 345/163; 345/169; 345/158

(58) Field of Classification Search ................. 345/158, 345/163, 169
See application file for complete search history.

(56) References Cited

U.S. PATENT DOCUMENTS

| 5,943,625 | A  | * | 8/1999  | Yeom et al. ................. 455/557 |
| 6,980,735 | B2 | * | 12/2005 | Horiguchi .................... 396/429 |
| 2004/0179330 | A1 | * | 9/2004 | Lee et al. ..................... 361/679 |
| 2006/0088310 | A1 | * | 4/2006 | Jung .......................... 396/429 |

\* cited by examiner

*Primary Examiner*—Amr Awad
*Assistant Examiner*—Jarurat Suteerawongsa
(74) *Attorney, Agent, or Firm*—Kirton & McConkie; Evan R. Witt

(57) ABSTRACT

A shape-changeable mouse includes a first housing, a second housing and a connecting member. Via the connecting member, the first housing is connected with the second housing. The second housing is rotated with respect to the first housing to change the shape of the mouse.

6 Claims, 4 Drawing Sheets

SHAPE-CHANGEABLE MOUSE

FIELD OF THE INVENTION

The present invention relates to a mouse, and more particularly to a shape-changeable mouse.

BACKGROUND OF THE INVENTION

Due to the amazing power of personal computers, personal computers are developed to have various functions. For example, the person computers have word processing functions in the earlier stage and are nowadays used for presentation or used as amusement video tools.

For complying with these various functions of the personal computer, in addition to the conventional cursor control function, the mouse usually has additional function keys used as the controller for presentation control and/or video control.

In a case that the mouse is used as a cursor control device, by moving the mouse on a desk plane, the cursor shown on the display screen of the personal computer is moved in the corresponding movement direction of the mouse. In another case that the mouse is used as a remote controller for presentation control and/or video control, the mouse is held on the palm of the user's hand and the function keys are pressed down to input the operating instructions.

Generally, the shape of the mouse used as the cursor control device and the shape of the mouse used as the remote controller are different. In a case that the mouse is used as a cursor control device to be moved on the desk plane, the surface of the mouse contacting with the palm of the user's hand should be cambered rather than flat. The cambered surface of the mouse may facilitate supporting the palm of the user's hand. Whereas, in another case that the mouse is used as the remote controller, the user favors the mouse having a flat shape as the conventional remote controller.

In other words, it is difficult to design a slim mouse having both functions of using as the cursor control device and the remote controller due to the above reasons. If the housing of the mouse is too thin, the mouse fails to meet the ergonomic demand when the mouse is moved on the desk plane. In contrast, for meeting the requirement of ergonomics, the height and thickness of the mouse should be increased. Under this circumstance, the touch feel of the mouse is impaired when the mouse is used as the remote controller.

In views of the above-described disadvantages resulted from the prior art, the applicant keeps on carving unflaggingly to develop an improved mouse according to the present invention through wholehearted experience and research.

SUMMARY OF THE INVENTION

It is an object of the present invention to provide a shape-changeable mouse, in which a second housing is rotatable with respect to a first housing to change the shape of the mouse.

In accordance with an aspect of the present invention, there is provided a shape-changeable mouse. The shape-changeable mouse includes a first housing, a second housing and a connecting member. The first housing includes a first slant, a first notch and a retaining hole. The second housing includes a second slant, a second notch and a retaining post. The connecting member is used for connecting the first housing and the second housing so that the second housing is rotatable with respect to the first housing. The connecting member includes a connecting frame, a rotating shaft, a helical spring and a stopping piece. The connecting frame includes a first connecting plate and a second connecting plate, wherein the first connecting plate includes a first perforation, the second connecting plate includes a second perforation, and the first perforation is aligned with the second perforation. The rotating shaft penetrates through the first perforation and the second perforation. The helical spring is sheathed around the rotating shaft. The stopping piece includes a stopping piece hole. The rotating shaft penetrates through the stopping piece hole such that the stopping piece is sustained against the helical spring.

In an embodiment, the first connecting plate is disposed in the first notch, and the second connecting plate is disposed in the second notch.

In an embodiment, the helical spring is arranged between the stopping piece and the second connecting plate.

In an embodiment, the first housing further includes a first receiving part for fixing the first connecting plate therein, and the second housing further includes a second receiving part for fixing the second connecting plate therein.

In an embodiment, the retaining post of the second housing is inserted into the retaining hole of the first housing.

In an embodiment, the rotating shaft further includes a rotating shaft hole.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the above described drawbacks, the present invention relates to a shape-changeable mouse. By changing the shapes, the shape-changeable mouse of the present invention may be operated in two different use modes. In the first use mode, the shape-changeable mouse functions as a remote controller. In the second use mode, the shape-changeable mouse functions as a cursor control device.

Figure 1A:
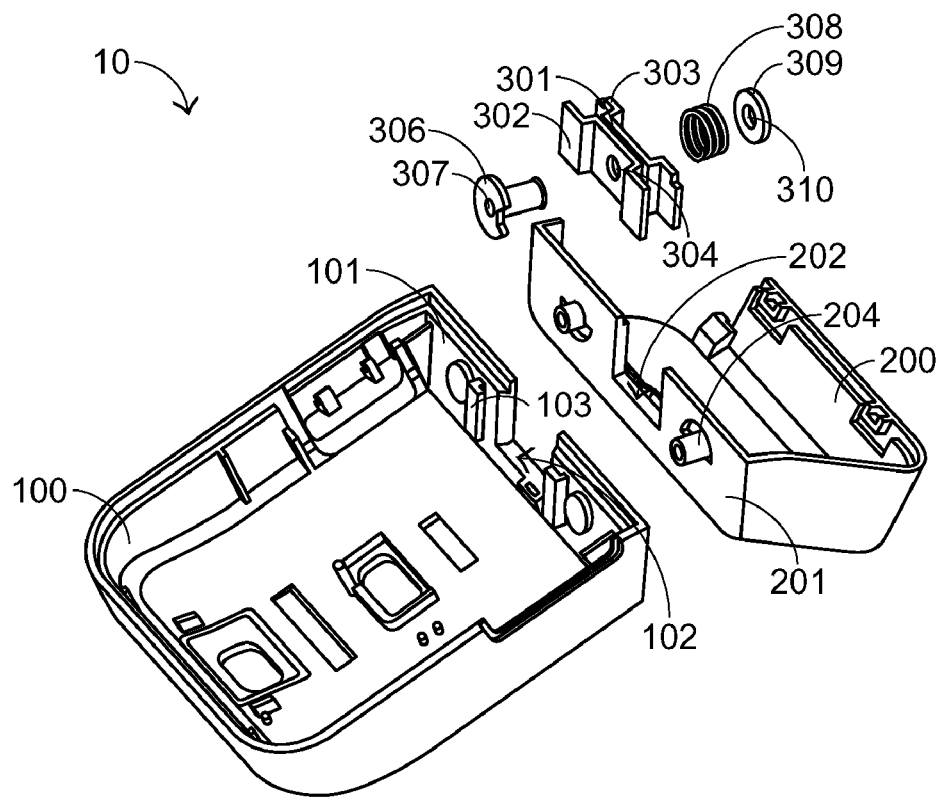
FIGS. 1A and 1B are schematic exploded views of a shape-changeable mouse taken from different viewpoints according to a preferred embodiment of the present invention.
Figure 1B:
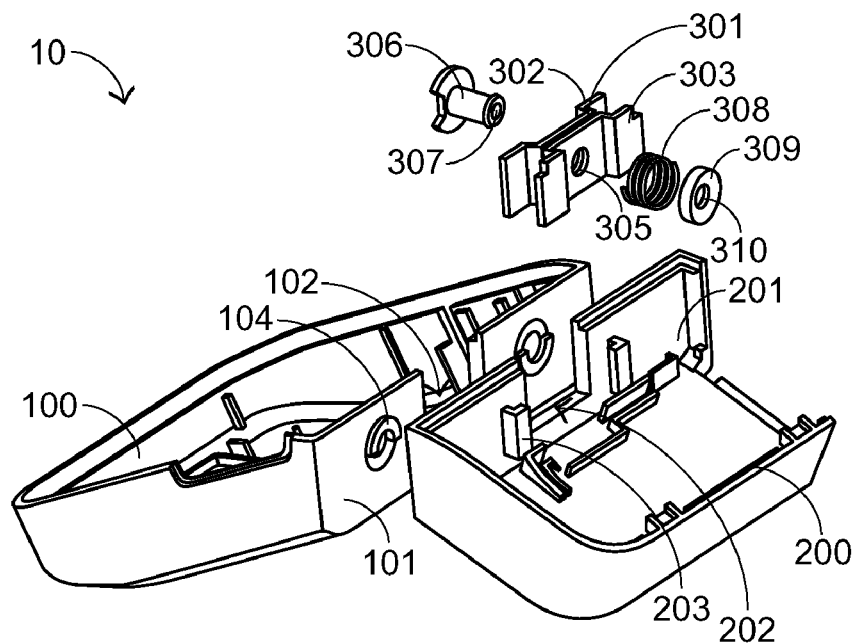

FIGS. 1A and 1B are schematic exploded views of a shape-changeable mouse taken from different viewpoints according to a preferred embodiment of the present invention. The shape-changeable mouse 10 includes a first housing 100, a second housing 200 and a connecting member 300. The first housing 100 includes a first slant 101, a first notch 102, a first receiving part 103 and two retaining holes 104. The second housing 200 includes a second slant 201, a second notch 202, a second receiving part 203 and two retaining posts 204. The connecting member 300 including a connecting frame 301, a rotating shaft 306, a helical spring 308 and a stopping piece 309. The connecting frame 301 includes a first connecting plate 302 and a second connecting plate 303. The first connecting plate 302 includes a first perforation 304. The second connecting plate 303 includes a second perforation 305. The rotating shaft 306 includes a rotating shaft hole 307. The stopping piece 309 includes a stopping piece hole 310.

Please refer to FIG. 1A again. The first notch 102 is disposed in the first slant 101 of the first housing 100. The first receiving part 103 is arranged within the first housing 100 and beside the first notch 102. The retaining holes 104 are disposed in the external surface of the first slant 101 (as is shown in FIG. 1B). Please refer to FIG. 1B again. The second notch 202 is disposed in the second slant 201 of the second housing 200. The second receiving part 203 is arranged within the second housing 200 and beside the second notch 202. The retaining posts 204 are protruded from the external surface of the second slant 201 (as is shown in FIG. 1A). In this embodiment, the components for operating the mouse, for example the optical sensor, the circuit board and the like, are disposed within the first housing 100. Whereas, the battery for use with the mouse is accommodated within a receptacle of the second housing 200.

Figure 2:
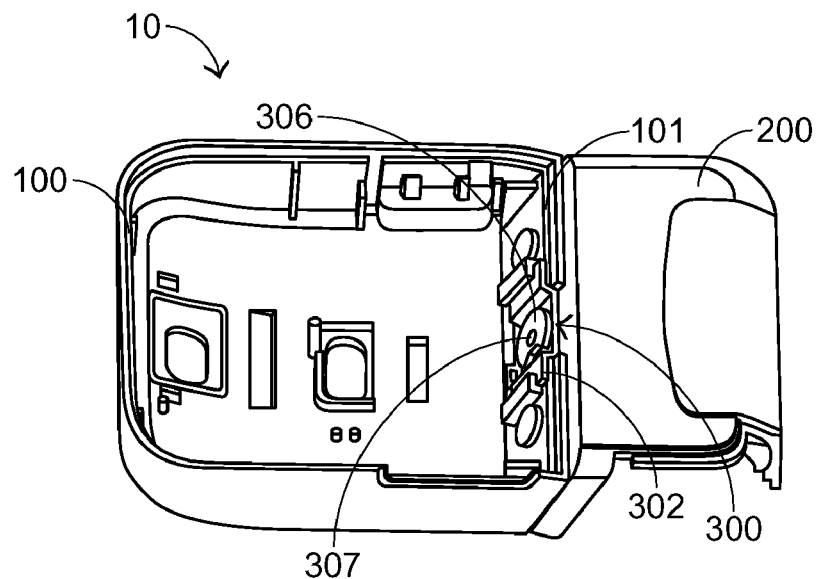
FIG. 2 is a schematic assembled view of the shape-changeable mouse.

FIG. 2 is a schematic assembled view of the shape-changeable mouse. The first connecting plate 302 of the connecting member 300 is embedded into the first receiving part 103 of the first housing 100. In addition, the retaining posts 204 (as shown in FIG. 1A) are inserted into corresponding retaining holes 104 (as shown in FIG. 1B). Consequently, the first housing 100 is combined with and fixed to the second housing 200 via the connecting member 300. Under this circumstance, the first housing 100 and the second housing 200 fail to rotate with respect to each other.

Figure 3:
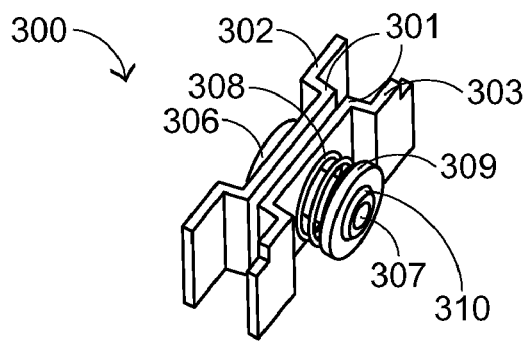
FIG. 3 is a schematic perspective view illustrating a connecting member used in the shape-changeable mouse of the present invention.

Referring to FIG. 3, a schematic perspective view of the connecting member 300 for connecting the first housing 100 and the second housing 200 is illustrated. For assembling the connecting member 300, the first perforation 304 of the first connecting plate 302 is aligned with the second perforation 305 of the second connecting plate 303, and then the rotating shaft 306 is penetrated through the first perforation 304 and the second perforation 305. Next, after the helical spring 308 is sheathed around the rotating shaft 306, the rotating shaft 306 is penetrated through the stopping piece hole 310 of the stopping piece 309. The stopping piece 309 is fixed to the rotating shaft 306 by for example a riveting connection. Meanwhile, the helical spring 308 is sustained between the second connecting plate 303 and the stopping piece 309. For coupling the first housing 100 with the second housing 200 via the connecting member 300, the first connecting plate 302 of the connecting member 300 is disposed in the first notch 102 and embedded into the first receiving part 103 of the first housing 100. Likewise, the second connecting plate 303 is disposed in the second notch 202 and embedded into the second receiving part 203 of the second housing 200. Moreover, due to the compressive forces applied on the connecting frame 301 by the first housing 100 and the second housing 200, the connecting frame 301 is fixed in the first receiving part 103 and the second receiving part 203 without using screws to fasten the connecting frame 301 onto the slants 101 and 201. It is noted that, however, those skilled in the art will readily observe that numerous modifications and alterations of the connecting member 300 may be made while retaining the teachings of the invention. For example, the head portion of the rotating shaft 306 of the connecting member 300 may be disposed adjacent to the first housing 100, as is shown in FIG. 2. Alternatively, the head portion of the rotating shaft 306 of the connecting member 300 may be disposed adjacent to the second housing 200.

By means of the connecting frame 301 and the rotating shaft 306, the second housing 200 is rotatable with respect to the first housing 100. Please refer to FIGS. 2 and 3 again. The helical spring 308 is sustained between the second connecting plate 303 and the stopping piece 309. The stopping piece 309 is fixed to the rotating shaft 306 to avoid disintegration of the connecting member 300. The helical spring 308 is in a compressed state when the second connecting plate 303 is moved toward the helical spring 308. When the helical spring 308 is in the compressed state, the second connecting plate 303 is separated from the first connecting plate 302 and the second housing 200 is separated from the first housing 100. As a consequence, the retaining posts 204 are detached from corresponding retaining holes 104 at this moment.

Figure 4:
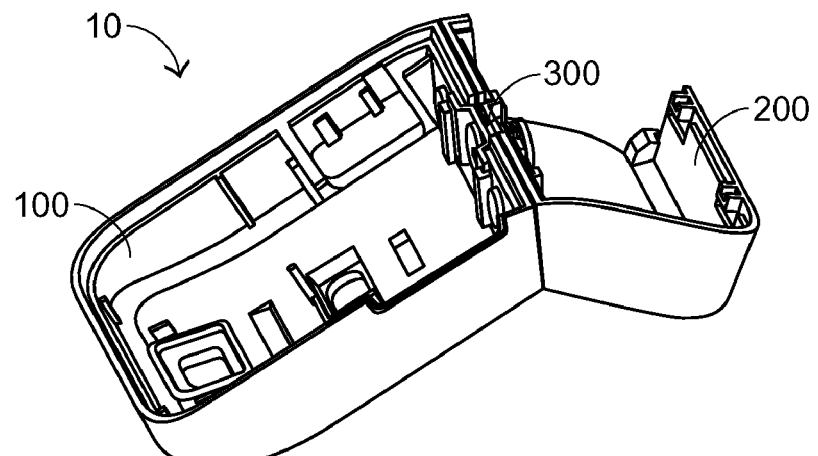
FIG. 4 is a schematic perspective view illustrating the shape-changeable mouse of FIG. 2 after the second housing thereof is rotated by 180 degrees.

Please refer to FIG. 4, which illustrates the relative positions of the first housing 100, the second housing 200 and the connecting member 300 after the second housing 200 as shown in FIG. 2 is rotated by 180 degrees. Meanwhile, the retaining posts 204 are also inserted into corresponding retaining holes 104, so that the first housing 100 is combined with and fixed to the second housing 200 via the connecting member 300. Meanwhile, the shape-changeable mouse has a cambered surface for resting a user's palm thereon.

The operating mechanism of the shape-changeable mouse of the present invention will be illustrated in more details with reference to FIGS. 5A, 5B, 5C and 5D.

Figure 5A:
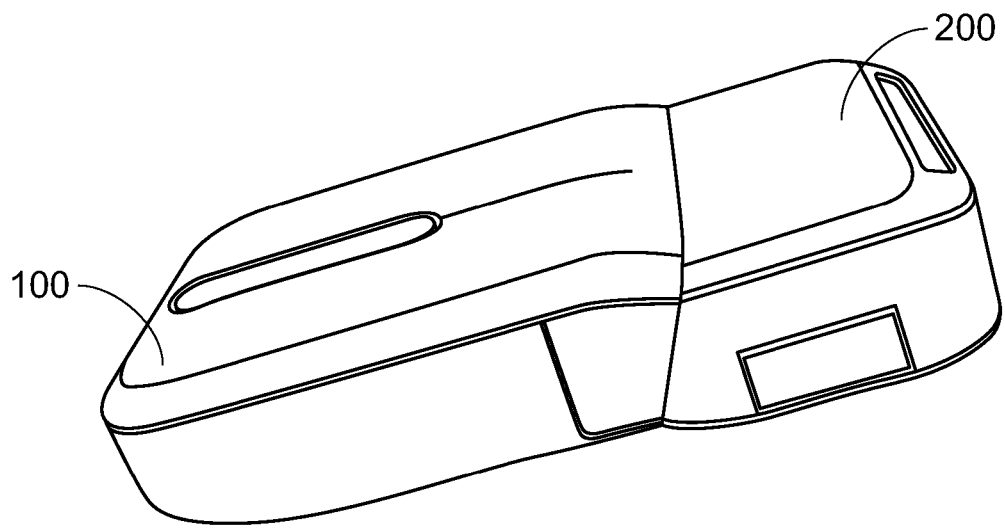
FIGS. 5A, 5B, 5C and 5D are schematic views illustrating the operating mechanism of the shape-changeable mouse of the present invention.

In a case that the shape-changeable mouse 10 is not acted as the cursor control device to be moved on the desk plane, the first slant 101 of the first housing 100 is in contact with the second slant 201 of the second housing 200. Under this circumstance, the shape-changeable mouse 10 has a flat shape as shown in FIG. 5A.

Figure 5B:
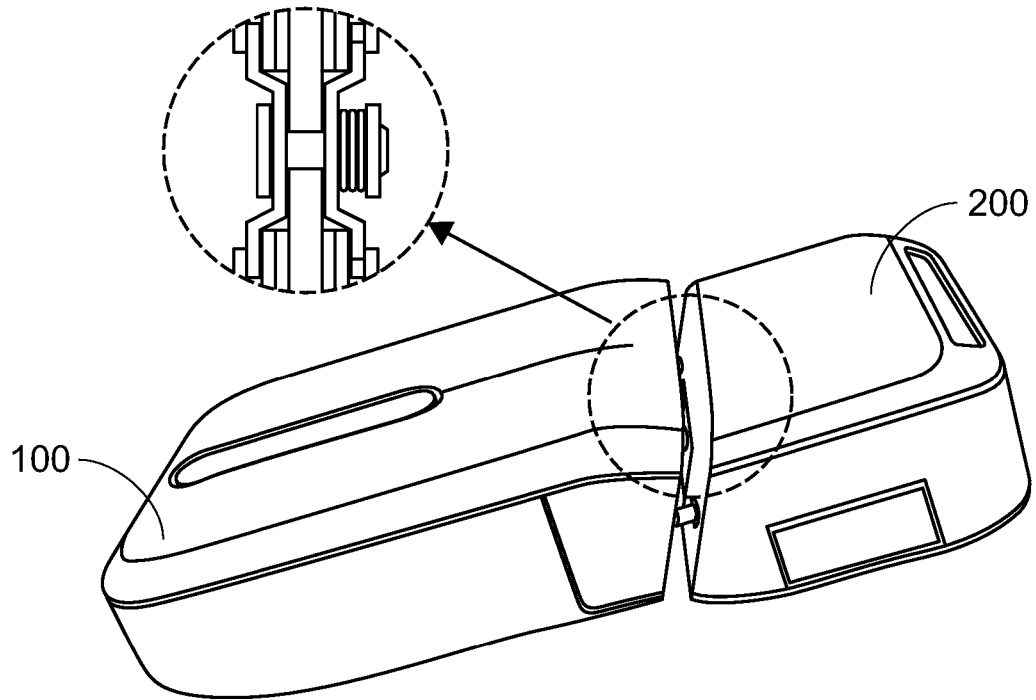
Figure 5C:
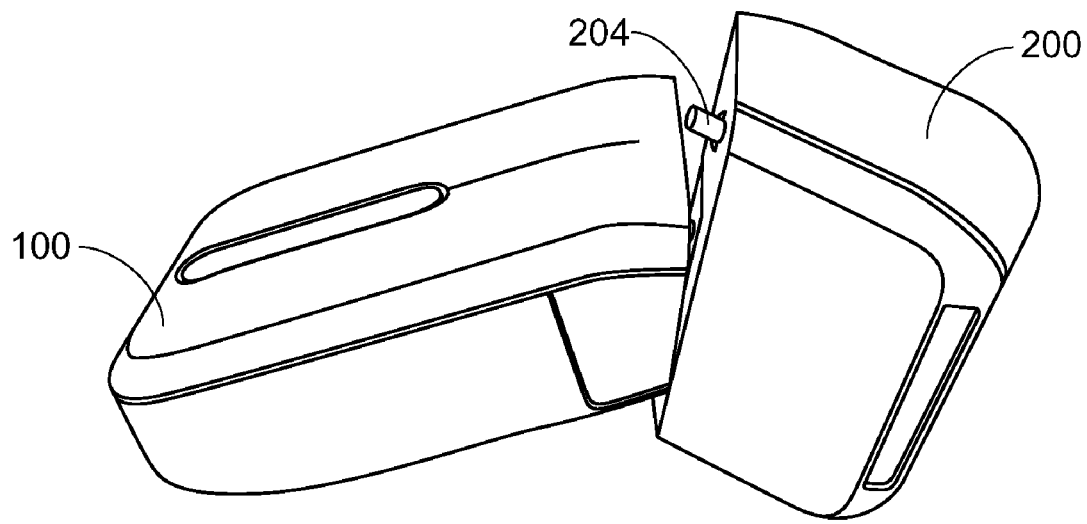
Figure 5D:
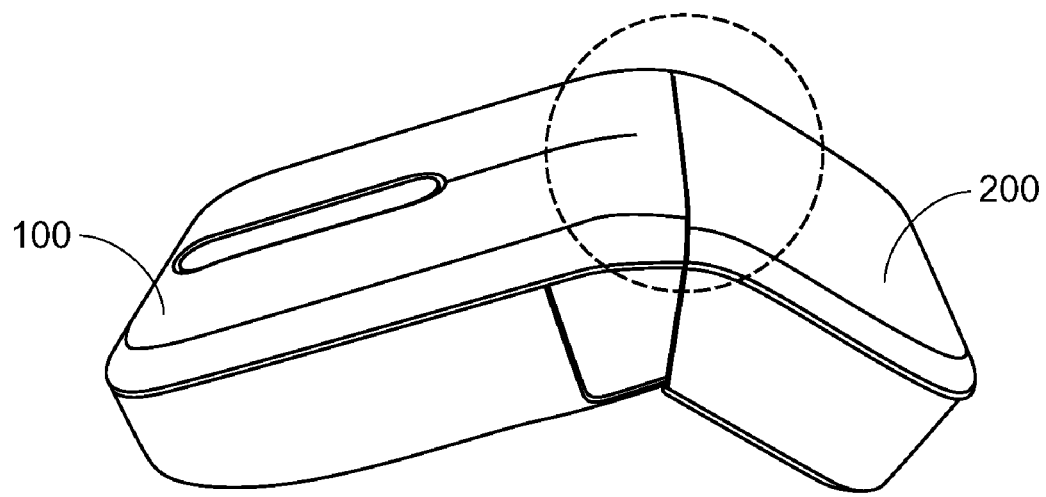

If the user intends to move the mouse on the desk plane, the second housing 200 should be firstly separated from the first housing 100 in response to an external force applied on the second housing 200 and opposed to the first housing 100, as is shown in FIG. 5B and indicated in the enlarged dashed circle. Meanwhile, the helical spring 308 is compressed and the retaining posts 204 are detached from corresponding retaining holes 104. After the retaining posts 204 are fully separated from corresponding retaining holes 104, the second housing 200 begins to rotate with respect to the first housing 100, as is shown in FIG. 5C. After the second housing 200 is rotated by 180 degrees and the external force for pulling the second housing 200 away the first housing 100 is eliminated, the helical spring 308 is switched from the compressed state to a stretched state. Next, the second housing 200 is moved toward the first housing 100, and the retaining posts 204 are inserted into corresponding retaining holes 104 again. Meanwhile, the first housing 100 is combined with and fixed to the second housing 200 via the connecting member 300. After the second housing 200 is rotated by 180 degrees, the first slant 101 of the first housing 100 is in contact with the second slant 201 of the second housing 200 again, as is shown in FIG. 5D. Due to the contact between the first slant 101 and the second slant 201, the shape-changeable mouse 10 has a cambered shape as is indicated in the dashed circle. Under this circumstance, the shape-changeable mouse 10 can be used as a cursor control device to be moved on the desk plane when the user's palm is rested on the cambered surface.

Likewise, if the mouse is not acted as the cursor control device, the second housing 200 may be rotated by 180 degrees, so that the shape-changeable mouse 10 is returned to have the flat shape again.

Please refer to FIG. 2 again. A conducting wire (not shown) has a terminal connected to the components (not shown) inside the second housing 200 and is penetrated through the rotating shaft hole 307 of the rotating shaft 306 such that the other terminal of the conducting wire is connected to the components (not shown) inside the first housing 100. Since the conducting wire is penetrated through the rotating shaft hole 307 of the rotating shaft 306, the second housing 200 should be rotated with respect to the first housing 100 in a specified direction so as to avoid tangle or damage of the conducting wire. For example, if the shape-changeable mouse 10 is switched from a flat shape to a cambered shape in a clockwise rotation of the second housing 200, the second housing 200 is rotated in an anti-clockwise direction when the shape-changeable mouse 10 is switched from the cambered shape to the flat shape. In such manner, the problem of tangling the conducting wire will be overcome.

From the above description, since the second housing is rotatable relative to the first housing, the shape-changeable mouse has both functions of using as either a cursor control device or a remote controller according to the user's requirement. In other words, the mouse of the present invention may be adjusted to have a flat shape when acted as a remote controller and meet the ergonomic demand when acted as a cursor control device. When the first slant of the first housing is in contact with the second slant of the second housing and the retaining posts are inserted into corresponding retaining holes, the first housing is combined with and fixed to the second housing via the connecting member. In addition, since the retaining posts are fixed in corresponding retaining holes, the assembling tolerance of the shape-changeable mouse may be increased to maintain smooth contact between the first housing and the second housing. Moreover, the first connecting plate and the second connecting plate are embedded into the first receiving part and the second receiving part, respectively. The compressive forces applied on the connecting frame by the first housing and the second housing may facilitate fixing the first connecting plate and the second connecting plate onto the first housing and the second housing, respectively, without using screws to fasten the connecting frame onto the slants.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A shape-changeable mouse comprising:
   a first housing including a first slant, a first notch and a retaining hole;
   a second housing including a second slant, a second notch and a retaining post, wherein said first housing or said second housing comprises an optical sensor and circuit board to provide cursor control; and
   a connecting member for connecting said first housing and said second housing so that said second housing is rotatable with respect to said first housing, wherein rotation of said second housing with respect to said first housing about the connecting member converts the shape-changeable mouse between a flat shape held in a user's palm to provide a remote controller for presentation and/or video control and a cambered shape to move on a desk plane and provide cursor control, said cambered shape comprising an angle greater than 90 degrees and less than 180 degrees, said connecting member including:
   a connecting frame including a first connecting plate and a second connecting plate, wherein said first connecting plate includes a first perforation, said second connecting plate includes a second perforation, and said first perforation is aligned with said second perforation, wherein said first connecting plate is disposed in said first notch, and said second connecting plate is disposed in said second notch and wherein said first housing further includes a first receiving part for fixing said first connecting plate therein, and said second housing further includes a second receiving part for fixing said second connecting plate therein;
   a rotating shaft penetrating through said first perforation and said second perforation;
   a helical spring sheathed around said rotating shaft; and
   a stopping piece including a stopping piece hole, said rotating shaft penetrating through said stopping piece hole such that said stopping piece is sustained against said helical spring.

2. The shape-changeable mouse according to claim 1 wherein said helical spring is arranged between said stopping piece and said second connecting plate.

3. The shape-changeable mouse according to claim 1 wherein said retaining post of said second housing is inserted into said retaining hole of said first housing.

4. The shape-changeable mouse according to claim 1 wherein said rotating shaft further includes a rotating shaft hole.

5. The shape-changeable mouse according to claim 1 wherein the first notch and the retaining hole are disposed on the first slant and wherein the second notch and the retaining post are disposed on the second slant.

6. The shape-changeable mouse according to claim 1 wherein the first slant is in contact with the second slant when the shape-changeable mouse is in the flat shape and in the cambered shape.

* * * * *